(12) United States Patent
Zimmer et al.

(10) Patent No.: US 11,514,268 B2
(45) Date of Patent: Nov. 29, 2022

(54) METHOD FOR THE SAFE TRAINING OF A DYNAMIC MODEL

(71) Applicant: Robert Bosch GmbH, Stuttgart (DE)

(72) Inventors: Christoph Zimmer, Korntal (DE); Mona Meister, Stuttgart (DE); The Duy Nguyen-Tuong, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 768 days.

(21) Appl. No.: 16/549,671

(22) Filed: Aug. 23, 2019

(65) Prior Publication Data

US 2020/0074237 A1  Mar. 5, 2020

(30) Foreign Application Priority Data

Sep. 5, 2018 (DE) .......................... 102018215061.3

(51) Int. Cl.
*G06K 9/62* (2022.01)
*G06F 17/16* (2006.01)
*G06V 10/75* (2022.01)

(52) U.S. Cl.
CPC .......... *G06K 9/6262* (2013.01); *G06F 17/16* (2013.01); *G06K 9/6293* (2013.01); *G06V 10/757* (2022.01)

(58) Field of Classification Search
CPC .... G06K 9/6262; G06K 9/6293; G06F 17/16; G06V 10/757; G06N 5/003; G06N 7/005; G06N 20/10; G05B 13/048
See application file for complete search history.

(56) References Cited

U.S. PATENT DOCUMENTS

| | | | |
|---|---|---|---|
| 8,140,447 B2 * | 3/2012 | Kashima ................ | G06N 20/00 706/12 |
| 9,928,214 B2 * | 3/2018 | Avron ..................... | G06F 17/16 |
| 11,389,957 B2 * | 7/2022 | Romeres ................. | B25J 9/163 |
| 2020/0273560 A1 * | 8/2020 | Wolf ................ | G06Q 10/06312 |
| 2020/0382557 A1 * | 12/2020 | Woolward .......... | H04L 63/1441 |
| 2021/0003973 A1 * | 1/2021 | Chakrabarty ........ | G06K 9/6271 |
| 2022/0179419 A1 * | 6/2022 | Romeres ........... | G06N 3/006 |

(Continued)

OTHER PUBLICATIONS

Zimmer, et al. "Safe Active Learning for Time-Series Modeling with Gaussian Processes" NEURIPS 2018 published in book titled: Advances in Neural Information Processing Systems, (Year: 2018).*

(Continued)

*Primary Examiner* — Wesley J Tucker
(74) *Attorney, Agent, or Firm* — Norton Rose Fulbright US LLP; Gerard Messina

(57) ABSTRACT

A computer-implemented method for the safe, active training of a computer-aided model for modeling time series of a physical system using Gaussian processes, including the steps of establishing a safety threshold value α; initializing by implementing safe initial curves as input values on the system, creating an initial regression model and an initial safety model; repeatedly carrying out the steps of updating the regression model; updating the safety model; determining a new curve section; implementing the determined new curve section on the physical system and measuring output variables; incorporating the new output values in the regression model and the safety model until N passes have been carried out; and outputting the regression model and the safety model.

9 Claims, 2 Drawing Sheets

(56) References Cited

U.S. PATENT DOCUMENTS

2022/0197229 A1\* 6/2022 Klenske .............. G05B 13/042
2022/0236698 A1\* 7/2022 Froehlich ............ G05B 13/027

OTHER PUBLICATIONS

Sui, et al. "Safe Exploration for Optimization with Gaussian Processes" ICML'15: Proceedings of the 32nd International Conference on International Conference on Machine Learning—vol. 37, pp. 997-1005 (Year: 2015).\*

Schreiter, J. et al., "Safe Exploration for Active Learning With Gaussian Processes", ECML/PKDD, vol. 9286, 2015, pp. 1-21.

Binney, et al.: "Informative Path Planning for an Autonomous Underwater Vehicle", 2010 IEEE International Conference on Robotics and Automation (2010), pp. 4791-4796.

Koller, et al.:"Learning-based Model Predictive Control for Safe Exploration and Reinformcement Learning", arxiv.org. Cornell Univ. (2018), XP080861878, pp. 1-8.

Schillinger, et al.: "Safe Acrtive Learning and Safe Bayesian Optimization for Tuning a PI-Controller", IFAC PapersOnLine 50-I (2017), pp. 5967-5972.

\* cited by examiner

METHOD FOR THE SAFE TRAINING OF A DYNAMIC MODEL

CROSS REFERENCE

The present application claims the benefit under 35 U.S.C. § 119 of German Patent Application No. DE 102018215061.3 filed on Sep. 5, 2018, which is expressly incorporated herein by reference in its entirety.

BACKGROUND INFORMATION

The present invention relates to a method including a safety condition for active learning for modelling dynamic systems with the aid of time series based on Gaussian processes, a system that has been trained using this method, a computer program which includes instructions that are configured to carry out the method when it is executed on a computer, a machine-readable memory medium on which the computer program is stored, and a computer which is configured to carry out the method.

Safe exploration during active learning is described in "Safe Exploration for Active Learning with Gaussian Processes" by J. Schreiter, D. Nguyen-Tuong, M. Eberts, B. Bischoff, H. Markert and M. Toussaint (ECML/PKDD, Volume 9286, 2015). Specifically, selective data are detected in a static state.

Active learning deals with sequential data identification for learning an unknown function. In the process, the data points are selected sequentially for identification in such a way that the availability of the pieces of information required for the approximation of the unknown function is maximized. The general aim is to create an accurate model without providing more pieces of information than are necessary. In this way, the model becomes more efficient, since potentially cost-intensive measurements may be avoided.

Active learning is commonplace for classifying data, for example, for identifying images. For active learning in the case of time series models that represent physical systems, the data must be generated in such a way that relevant dynamic processes are able to be detected.

This means, the physical system must be stimulated by dynamic movement in the input area by input curves in such a way that the collected data, i.e., input and output curves, contain as many pieces of information about the dynamics as possible. Examples of input curves that may be used are, among others, sinus functions, ramp functions and step functions, and white noise. When stimulating the physical systems, however, it is also necessary to observe safety requirements. The stimulation must not damage the physical system as the input area is being dynamically explored.

It is important, therefore, to identify areas in which the dynamic stimulation may be safely carried out.

SUMMARY

An example method according to the present invention may have an advantage that it combines dynamic exploration, active exploration and safe exploration.

Dynamic exploration in this case is understood to mean the detection of pieces of information under changing conditions of the system to be measured. Active exploration aims for a preferably rapid detection of pieces of information, the pieces of information being detected sequentially in such a way that many pieces of information are able to be detected in a short period of time. In other words, the information gain of the individual measurement is maximized. Finally, safe exploration ensures that the system to be measured is preferably not damaged.

These three types of exploration may be combined using the example method according to the present invention.

Advantageous refinements of and improvements on the example method are described herein.

SUMMARY

The present invention provides an active learning environment with dynamic exploration (active learning) for time series models, based on Gaussian processes, which take the aspect of safety into consideration by deriving a suitable criterion for the dynamic exploration of the input area.

Active learning is useful in a series of applications, such as in simulations and forecasts. The goal of learning methods is, in general, to create a model that describes reality. For this purpose, a real process, a real system or a real object is measured, also referred to as objective below in the sense that pieces of information about the objective are detected. The reality model created may then be used in a simulation or forecast instead of the objective. An advantage of this approach is in the savings resulting from not having to repeat the process, since most resources are consumed in this case or that the object or the system is not exposed to the process to be simulated and potentially consumed, damaged or modified in the process.

It is advantageous if the model describes reality as accurately as possible. In the present invention, it is particularly advantageous that active learning may be used while taking safety conditions into consideration. These safety conditions are to ensure that the objective to be detected is influenced negatively/critically as little as possible, for example, in the sense that the object or the system is damaged.

In the present invention, a Gaussian process having a time series structure is used, for example, with the non-linear exogenous structure or with the non-linear autoregressive exogenous structure. By dynamically exploring the input area, input curves and output curves or output measurements appropriate for the time series model are generated. The output measurements, i.e., the data identification, serve as pieces of information for the time series model. In the process, the input curve is parameterized in successive curve areas, for example, successive sections of ramp functions or of step functions which, given safety requirements and preceding observations, are determined gradually using an explorative approach.

The respectively subsequent section is determined while taking the previous observations into consideration in such a way that the information gain with respect to a criterion relating to the model is maximized.

In the process, a Gaussian process having non-linear exogenous structures is used with a suitable exploration criterion as a time series model. At the same time, an additional Gaussian model is used in order to forecast safe input areas with respect to the given safety demands. The sections of the input curve are determined by solving an optimization problem with secondary conditions for taking the safety forecast into consideration.

Exemplary applications of the present invention are, for example, test benches for internal combustion engines, in which processes in the engines are intended to be able to be simulated. Parameters to be detected in this case are, for example, pressure values, exhaust values, consumption values, power values, etc. Another application is, for example, the learning of dynamic models of robot controllers, in which a dynamic model is to be learned, which maps joint positions on joint torques of the robot, which may be used for controlling the robot. This model may be actively learned through exploration of the joint area, however, this should be carried out in a safe manner so that the movement limits of the joints are not exceeded, as a result of which the robots may be damaged. Another application is, for example, the learning of a dynamic model that is used as a substitute for a physical sensor. The data for learning this model may be actively generated and measured through exploration on the physical system. A safe exploration is essential in this case, since a measurement in an unsafe region may damage the physical system. Another application is, for example, the learning of the behavior of a chemical reaction, in which the safety requirements may relate to parameters such as temperature, pressure, acidity or the like.

BRIEF DESCRIPTION OF THE DRAWINGS

Exemplary embodiments of the present invention are shown in the figures and are explained in greater detail below.

DETAILED DESCRIPTION OF EXAMPLE EMBODIMENTS

Figure 1:
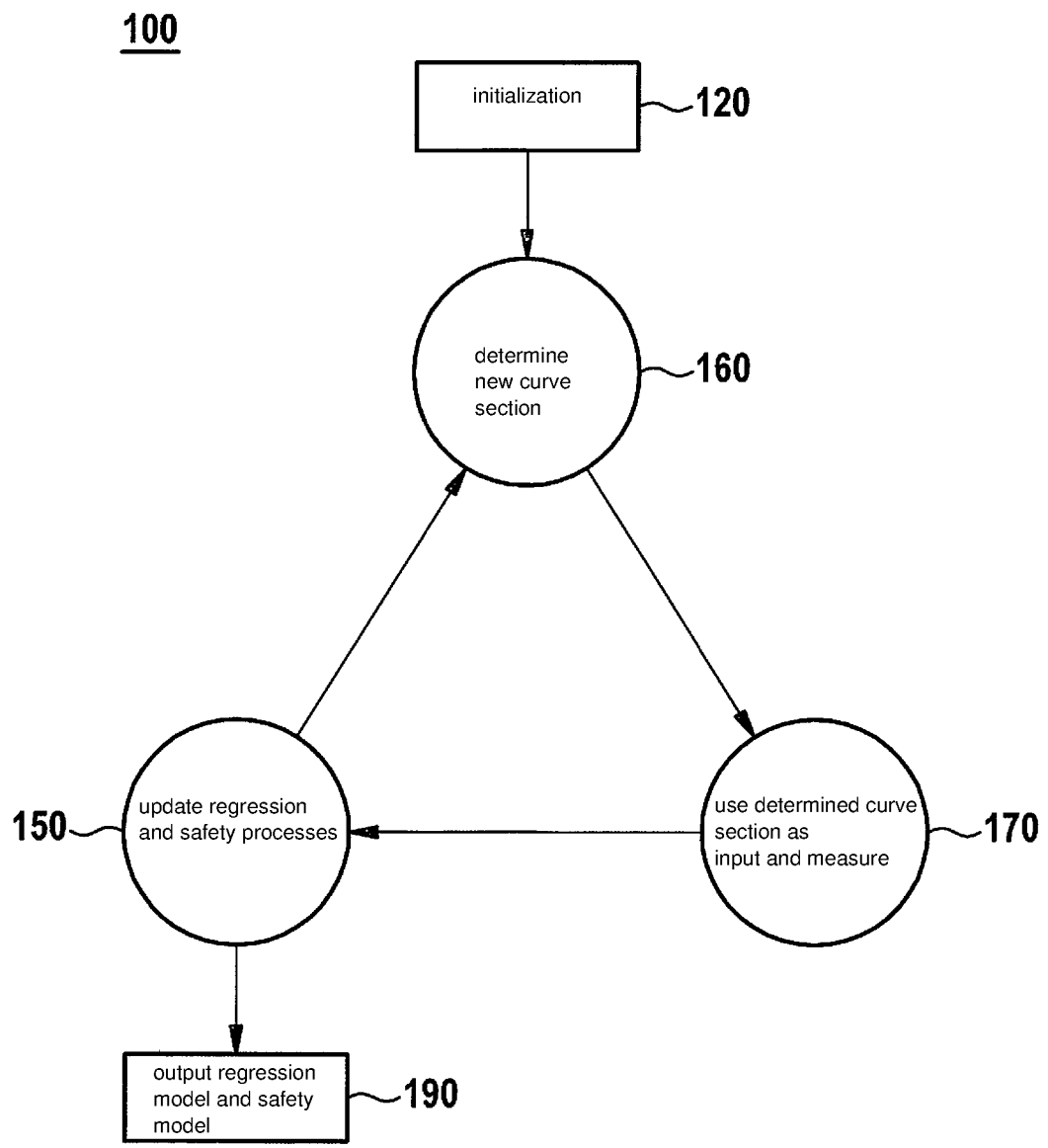
FIG. 1 shows the sequence 100 of the method for the safe training of a computer-aided model.

The approximation of an unknown function $f: X \subset \mathbb{R}^d \to Y \subset \mathbb{R}$ is to be achieved. In the case of time series models such as, for example, the well-known non-linear exogenous (NX) model, the input area is made up of discrete values, the so-called manipulated variables.

With $x_k$ for the point in time k, $(u_k, u_{k-1}, \ldots, u_{k-\bar{d}+1})$ is applicable, $(u_k)_k$, $u_k \in \pi \subset \mathbb{R}^{\bar{d}}$ representing the discretized curve. In this case, $\bar{d}$ is the dimension of input area, $\pi$ of the system, $\tilde{d}$ the dimension of the NX structure and $d = \bar{d} \cdot \tilde{d}$ the dimension of X.

The elements $u_k$ are measured by the physical system and need not be equidistant. For reasons of simpler notation, an equidistance is assumed by way of example. In general, the control curves are continuous signals and may be explicitly controlled.

Data in the form of n successive curve sections $D_n^f = \{\tau_i, \rho_i\}_{i=1}^n$ are observed in the learning environment of the model, the input curve $\tau_i$ being a matrix and being made up of m input points of dimension d, i.e., $\tau_i = (x_1^i, \ldots, x_m^i) \in \mathbb{R}^{d \times m}$. Output curve $\rho_i$ includes m corresponding output measurements, i.e., $\rho_i = (y_1^i, \ldots, y_m^i) \in \mathbb{R}^m$ The next curve section $\tau_{n+1}$ to be input as stimulation into the physical system is to be determined in such a way that the information gain $D_{n+1}^f$ with respect to the modelling of f is increased, taking safety conditions into consideration, however.

As an approximation of the function f, a Gaussian process (hereinafter abbreviated as GP) is used, which is established by its mean value function $\mu(x)$ and its covariance function $k(x_i, x_j)$, i.e., $f(x_i) \sim GP(\mu(x_i), k(x_i, x_j))$.

Assuming noisy observations of the input and output curves, the shared distribution according to the Gaussian process is given as $p(P_n|T_n) = N(P_n|0, K_n + \sigma^2 I)$, $P_n \in \mathbb{R}^{n \cdot m}$ being a vector, which connects output curves, and $T_n \in \mathbb{R}^{n \cdot m \times d}$ being a matrix containing input curves. The covariance matrix is represented by $K_n \in \mathbb{R}^{n \cdot m \times n \cdot m}$. As an illustration, a Gaussian core is used as a covariance function, i.e.,
$k(x_i, x_j) = \sigma_f^2 \exp(-\frac{1}{2}(x_i - x_j)^T \Lambda_f^2 (x_i - x_j))$, which is parameterized by $\theta_f = (\sigma_f^2, \Lambda_f^2)$. A zero vector $0 \in \mathbb{R}^{n \cdot m}$ is also assumed as a mean value, a nm-dimensional identity matrix I and $\sigma^2$ as an output noise variance.

Under the given shared distribution, the forecasted distribution $p(\rho^*|\tau^*, D_n^f)$ may be expressed for a new curve section $\tau^*$ as $$p(\rho^*|\tau^*, D_n^f) = N(\rho^*|\mu(\tau^*), \Sigma(\tau^*)), \quad \text{[equation A:]}$$

$$\mu(\tau^*) = k(\tau^*, T_n)^T (K_n + \sigma^2 I)^{-1} P_n, \quad \text{[equation B:]being}$$

$$\Sigma(\tau^*) = k^{**}(\tau^*, \tau^*) - k(\tau^*, T_n)^T (K_n + \sigma^2 I)^{-1} k(\tau^*, T_n) \quad \text{[equation C:]being}$$

$k^{} \in \mathbb{R}^{m \times m}$ being a matrix with $k_{ij}^{} = (x_i, x_j)$. Matrix $k^{**} \in \mathbb{R}^{m \times n \cdot m}$ further contains core evaluations with respect to $\tau^*$ of the previous n input curves. Since the covariance matrix is completely filled, input points x correlate both completely with a curve section as well as beyond various curves utilizing the correlations for planning the next curve. Since matrix $K_n + \sigma^2 I$ potentially has a high dimensional number n·m, its inversion may be time-consuming, so that GP approximation techniques may be used.

The safety status of the system is described by an unknown function g, with $g: X \subset \mathbb{R}^d \to Z \subset \mathbb{R}$, which assigns to each input point x a safety value z, which serves as a safety indicator. Values z are determined using pieces of information from the system, and are configured in such a way that for all values of z that are greater than or equal to zero, corresponding input point x is considered as safe.

Such safety values z are a function of the respective system and may, as explained above, embody system-dependent values for safe or unsafe pressure values, exhaust values, consumption values, power values, joint position values, movement limits, sensor values, temperature values, acidity values or the like.

The values of z are generally continuous and indicate the distance of a given point x from the unknown safety limit in the input area. Thus, the safety level for a curve $\tau$ may be ascertained with the given function g or with an estimation thereof. A curve is classified as safe if the probability that its safety value z is greater than zero is sufficiently great, i.e., $\int_{z_1, \ldots, z_m \geq 0} p(z_1, \ldots, z_m|\tau) dz_1, \ldots, z_m > 1 - \alpha$ with $\alpha \in [0, 1]$ representing the threshold value for the fact that $\tau$ is unsafe. With the given data $D_n^g = \{\tau_i, \zeta_i\}_{i=1}^n$, with $\zeta_i = (z_1^i, \ldots, z_m^i) \in \mathbb{R}^m$ a GP may be used in order to approximate the function g. The forecast distribution $p(\zeta^*|\tau^*, D_n^g)$ for a given curve section $\tau^*$ is calculated as $$p(\zeta^*|\tau^*, D_n^g) = N(\zeta^*|\mu_g(\tau^*), \Sigma_g(\tau^*)) \quad \text{[equation D:]}$$

$\mu_g(\tau^*)$ and $\Sigma_g(\tau^*)$ being the corresponding mean value and covariance values. The variables $\mu_g$ and $\Sigma_g$ are calculated as shown in equation 2 and 3, however, with $Z_n \in \mathbb{R}^{n \cdot m}$ as the target vector, which connects all $\zeta_i$. By using a GP for approximating g, safety condition $\xi(\tau)$ may be calculated for a curve $\tau$ as follows $$\xi(\tau) = \int_{z_1, \ldots, z_m \geq 0} N(\zeta|\mu_g(\tau), \Sigma_g(\tau)) dz_1, \ldots, z_m > 1 - \alpha. \quad \text{[equation E:]}$$

The calculation of $\xi(\tau)$ is generally difficult to solve analytically, and thus a certain approximation may be used such as, for example, a Monte-Carlo simulation or expectation value propagation ("expectation propagation").

For the efficient selection of an optimal $\tau$, the curve must be parameterized in a suitable manner. One possibility is to perform the parameterization already in the input area. The parameterization of the curve may be implemented, for example, as ramp functions or step functions.

For a curve parameterization with a forecast distribution according to equation A and safety conditions according to equation E, the next curve section $\tau_{n+1}(\eta^*)$ may be obtained by solving the following optimization problem with secondary conditions:

$$\eta^* = \arg\max_{\eta \in \pi} J(\Sigma(\eta)) \quad \text{[equation F:]}$$

$$\text{so that } \xi(\eta) > 1 - \alpha, \quad \text{[equation G:]}$$

$\eta \in \pi$ representing the curve parameterization and J an optimality criterion.

According to equation F, predictive variance $\Sigma$ from equation A is used for the exploration. This is a covariance matrix, which is mapped on a real number by optimality criterion J, as shown in equation F. Different optimality criteria may be used for J as a function of the system. Thus, J may, for example, be the determinant, i.e., equivalent to maximizing the volume of the forecast reliance ellipsoid of the multi-normal distribution, the trace, i.e., equivalent to maximizing the average forecast variance, or the maximum intrinsic value, i.e., equivalent to maximizing the largest axis of the forecast reliance ellipsoid. However, other optimality criteria are also conceivable.

Referring to FIG. 1, an initialization is carried out in step 120 by implementing $n_0$ safe initial curves. A regression and safety process, Gaussian processes are also created in the process. The initial curves are located in a small safe area in which the exploration begins. This small safe area is selected in advance as a result of prior knowledge about the system. The initial curves are determined to $D_0^{f,g} = \{\tau_i, \rho_i, \zeta_i\}_{i=1}^n$ with $n = n_0$.

A new curve section $\tau_{m+1}$ is subsequently determined in step 160 according to equations F and G by optimizing $\eta$.

Determined curve section $\tau_{n+1}$ is subsequently used as input in step 170 and measured in this area $\rho_{n+1}$ and $\zeta_{n+1}$ on the physical system.

The regression and safety processes are then updated in step 150. Regression model f is updated according to equation A using $D_n^f = \{\tau_i, \rho_i\}_{i=1}^n$, and safety model g is updated according to equation D using $D_n^g = \{\tau_i, \zeta_i\}_{i=1}^n$.

The steps 150 through 170 in this case are passed through N-times. In addition to a previously established number of passes, an automatic ending after reaching a termination condition is also possible. This could be based, for example, on training errors (error metric in model prediction and system response) or on an additional potential information gain (if the optimality criterion becomes too small).

Subsequently, the regression model and the safety model are output in step 190.

Figure 2:
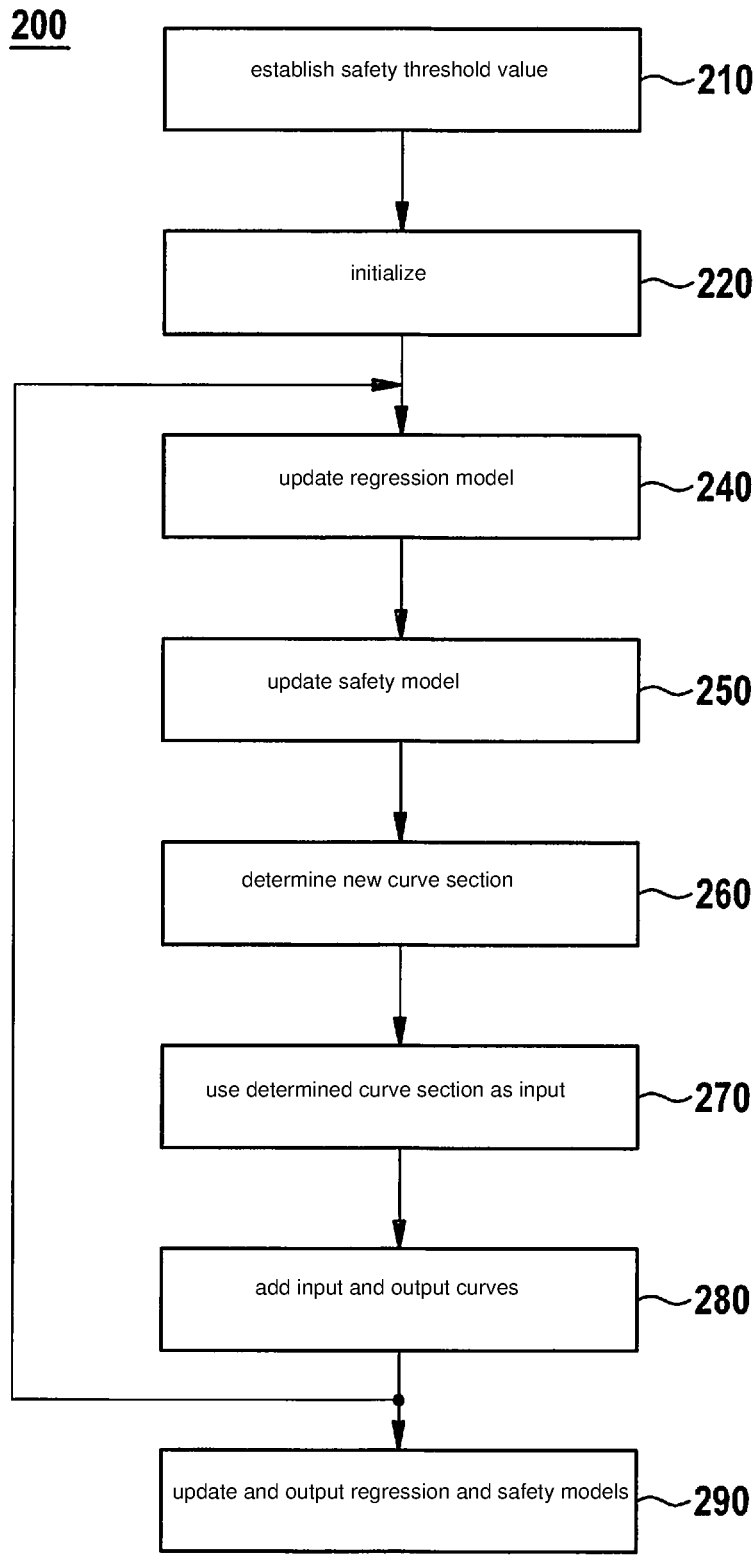
FIG. 2 shows the sequence 200 of the method for the safe training of a computer-aided model.

Referring to FIG. 2, an implementation 200 of the method is explained. In step 210, a safety threshold value is established. In the process, a value between 0 and 1 is selected for $\alpha$. An initialization is then carried out in step 220 by implementing $n_0$ safe initial curves, $D_0^{f,g} = \{\tau_i, \rho_i, \zeta_i\}_{i=1}^n$, with $n = n_0$. In this way, regression and safety processes (Gaussian processes) are also created. The initial curves are located in a small safe area in which the exploration begins. This small safe area is selected in advance as a result of prior knowledge about the system.

The part of the method encompassing steps 240 through 280 is carried out N times, k being the control variable, i.e., indicating the instantaneous pass. As in FIG. 1, an automatic ending after reaching a termination condition is conceivable, in addition to a previously established number of passes. This could, for example, be based on training errors (error metric in model prediction and system response) or on an additional potential information gain (if the optimality criterion becomes too small).

Regression model f according to equation A is first updated in step 240 using $D_k^f = \{\tau_i, \rho_i\}_{i=1}^n$. In step 250, safety model g according to equation D is updated using $D_k^g = \{\tau_i, \zeta_i\}_{i=1}^n$. In the first pass of steps 240 through 280, steps 240 and 250 may be omitted.

A new curve section $\tau_{n+1}$ is subsequently determined in step 260 according to equations F and G by optimizing $\eta$.

Determined curve section $\tau_{n+1}$ is subsequently used as input in step 270 and measured in this area $\rho_{n+1}$ and $\zeta_{n+1}$ on the physical system.

The input and output curves to $D_{k-1}^f$ and $D_{k-1}^g$ processed in the preceding steps are then added in step 280.

After the repetitions of steps 240 through 280 are completed, step 290 follows, in which the regression and safety model are updated and output.

The incremental updating of the GP model for new data, i.e., steps 150, respectively 240 and 250, may be efficiently carried out, for example, by updating the range of the matrix (rank-one update). A NX structure is shown by way of example here in combination with the GP model for time series modelling, however, the general, non-linear autoregressive exogenous case may also be used, i.e., GP with NARX input structure, where $x_k = (y_k, y_{k-1}, \ldots, y_{k-q}, u_k, u_{k-1}, \ldots, u_{k-d})$. In this case, the forecast mean value of $p(\rho|\tau, D_n^f)$, for example, may be used as a substitute for $y_k$ for optimizing and for planning for the next curve section. The input stimulation of the system is nevertheless carried out via manipulation variable $u_k$ in the case of NARX.

What is claimed is:

1. A computer-implemented method for the safe, active training of a time series-based model of a physical system using Gaussian processes, the method comprising:
   establishing a safety threshold value;
   initializing by implementing safe initial curves as input values on the system, creating an initial regression model and an initial safety model;
   repeatedly carrying out for a plurality of passes, the following steps:
   updating the regression model;
   updating the safety model;
   determining a new curve section;
   implementing a determined new curve on the physical system and measuring new output values; and
   incorporating the new output values in the regression model and the safety model; and
   updating and outputting the regression model and the safety model.

2. The method as recited in claim 1, wherein the new curve section is determined in such a way that information gain is maximized while meeting safety criteria of the safety model.

3. The method as recited in claim 1, wherein the new curve section is determined while using a covariance matrix.

4. The method as recited in claim 1, wherein the new curve section is determined via optimization under a secondary condition.

5. The method as recited in claim 1, wherein the system is a test bench for internal combustion engines, a robot controller, a physical sensor, or a chemical reaction.

6. The method as recited in claim 1, wherein the safety model includes values of the system, the values of the system including: pressure values, and/or exhaust values, and/or consumption values, and/or power values, and/or joint position values, and/or movement limits, and/or sensor values, and/or temperature values, and/or acidity values.

7. A non-transitory computer-readable memory medium on which is stored a computer-aided model of a physical system which is trained using Gaussian processes, the model being trained by:
  establishing a safety threshold value;
  initializing by implementing safe initial curves as input values on the system, creating an initial regression model and an initial safety model;
  repeatedly carrying out, for a plurality of passes, the following steps:
    updating the regression model;
    updating the safety model;
    determining a new curve section;
    implementing a determined new curve on the physical system and measuring new output values; and
    incorporating the new output values in the regression model and the safety model; and
  updating and outputting the regression model and the safety model.

8. A non-transitory machine-readable memory medium on which is stored a computer program for active training of a time series-based model of a physical system using Gaussian processes, the computer program, when executed by a computer, causing the computer to perform:
  establishing a safety threshold value;
  initializing by implementing safe initial curves as input values on the system, creating an initial regression model and an initial safety model;
  repeatedly carrying out, for a plurality of passes, the following steps:
    updating the regression model;
    updating the safety model;
    determining a new curve section;
    implementing a determined new curve on the physical system and measuring new output values; and
    incorporating the new output values in the regression model and the safety model; and
  updating and outputting the regression model and the safety model.

9. A device configured to actively train a time series-based model of a physical system using Gaussian processes, the device comprising a processor configured to:
  establish a safety threshold value;
  initialize by implementing safe initial curves as input values on the system, creating an initial regression model and an initial safety model;
  repeatedly carry out, for a plurality of passes, the following:
    updating the regression model;
    updating the safety model;
    determining a new curve section;
    implementing a determined new curve on the physical system and measuring new output values; and
    incorporating the new output values in the regression model and the safety model; and
  update and output the regression model and the safety model.

* * * * *